United States Patent Office 3,453,239
Patented July 1, 1969

3,453,239
PROCESS FOR THE MANUFACTURE OF COPOLYMERS OF TRIOXANE AND CYCLIC ETHERS WITH DIOXOLANYL - 4 - METHYL-ALKYL FORMALS
Edgar Fischer, Frankfurt am Main, and Claus Schott, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Feb. 13, 1967, Ser. No. 615,336
Claims priority, application Germany, Mar. 4, 1966, F 48,578
Int. Cl. C08g 1/14, 1/16, 1/04
U.S. Cl. 260—67                      6 Claims

ABSTRACT OF THE DISCLOSURE

Copolyacetals produced by copolymerization of trioxane, a cyclic ether and a dioxolanyl-4-methyl-alkyl formal and suitable for the manufacture of large-area articles, sheets, films and fibers, by injection-molding and extrusion-molding.

---

The present invention relates to a process for the manufacture of copolymers of trioxane, a cyclic ether and dioxolanyl-4-oxy-methyl-oxyalkyl formals having an improved flow.

It has already been proposed to prepare high molecular weight polymers with recurring oxymethylene units by polymerizing formaldehyde or by polymerizing trioxane. It has also been proposed to prepare thermally stable polyacetals by copolymerizing trioxane with a saturated cyclic ether, for example, glycol formal or ethylene oxide. Products of this type are preferably used in the field of injection molding. Moreover, it has been proposed to prepare copolymers from trioxane, a cyclic ether and bi-functional compounds. The bi-functional compounds known hitherto, however, easily cross-link the copolymers yielding products that do not melt.

Now we have found that copolymers of trioxane, a cyclic ether and bi-functional compounds can advantageously be prepared by polymerizing mixtures comprising 97.9 to 88 percent by weight of trioxane, 2 to 10 percent by weight of a cyclic ether and 0.1 to 2 percent by weight of dioxolanyl-4-methyl-alkyl formals.

The cyclic ether may be, for example, a compound having the formula

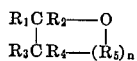

in which $R_1$, $R_2$, $R_3$ and $R_4$ each represent H, an alkyl radical or a halogen-substituted alkyl radical, and in which $R_5$ represents a methylene- or an oxymethylene radical, alkyl- or a halogen-alkyl-substituted methylene radical, or an alkyl- or a halogen-alkyl-substituted oxymethylene radical and $n$ represents 0, 1, 2 or 3, or in which $R_5$ represents —(O—CH$_2$—CH$_2$)$_m$—OCH$_2$, $n$ represent the integer 1 and $m$ represents 1, 2 or 3.

Each alkyl and halogen-substituted alkyl radical contains not more than 5 carbon atoms and the number of halogen substituents, which are preferably chlorine atoms, per halogen substituted alkyl radical is 1, 2 or 3. Ethylene oxide, glycol formal or diglycol formal are advantageously used as the cylic ether. Alternatively, there may be used, for example, propylene oxide, epichlorhydrin or 4-chloromethyl dioxolane.

As dioxolanyl-4-methyl-alkyl formals there may be used advantageously compounds of the formula

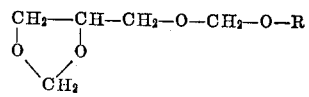

in which the alkyl group R contains 1 to 12 carbon atoms, preferably 1 to 6 carbon atoms. These compounds can be easily prepared, for example by reacting dioxolanyl-4-methyl-chloro-methyl ether

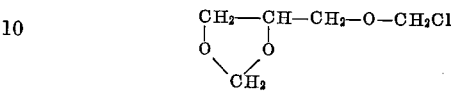

with alcohols in the presence of a base. As alkyl radicals there may be used, for example, methyl-, ethyl-, propyl- and butyl radicals. These formals are preferably used in an amount within the range of from 0.1 to 1.5 percent by weight.

The copolymers are distinguished by an essentially improved flow of the polymer melt, a property which is of decisive importance especially for the manufacture of large-area injection-molded articles.

Polymerization may be carried out in bulk, in solution or in suspension according to the methods hitherto used. As solvents there may preferably be used an inert aliphatic or aromatic hydrocarbon, halohydrocarbon or an ether. Bulk polymerization proceeds in an especially smooth manner. Polymerization may be carried out at a temperature within the range of —50° to +100° C., and the optimum temperature depends on the solvent used.

Polymerization is initiated by cationically active catalysts. Inorganic and organic acids, acid halides and especially Lewis acids are suitable catalysts (for the definition of Lewis acid, see Kortüm, "Lehrbuch der Elektrochemie," Wiesbaden 1948, pp. 300 and 301). Boron trifluoride or one of its complexes, for example, a boron trifluoride etherate, may be used with special advantage. The diazonium fluoroborates described in Belgian Patents 593,648 and 618,213 and the compounds described in Belgian Patent 585,980 are especially suitable. The amount of catalyst used may lie within wide limits. The most suitable amount depends upon the catalyst used and the desired molecular weight of the copolymer. The amount of the catalyst may lie within the range of 0.0001% to 1%, by weight, calculated on the monomer mixture; it is most advantageous to use the catalyst in an amount within the range of 0.001% to 0.1% by weight.

Since the catalyst tends to decompose the polymer, it is recommended to render it inactive directly after the copolymerization is complete, for example, by the use of ammonia or a methanolic or aromatic amino solution.

Unstable semi-acetal terminal groups can be removed by treating the copolymer in a manner which has been proposed for other copolymers; it is advantageous to suspend the copolymer in aqueous ammonia if desired in the presence of a swelling agent, for example, methanol or n-propanol, at a temperature within the range of 100° C. to 200° C., or to dissolve the copolymer at a temperature not less than 100° C. in a medium having an alkaline reaction and subsequently to recover the copolymer by precipitation. The solvent may be, for example, benzyl alcohol, ethylene glycol monoethyl ether or a mixture of 60 percent methanol and 40 percent water, and ammonia or an aliphatic amine may be used as a compound having an alkaline reaction.

The copolymer may be stabilized against the action of heat, light and oxygen by the respective methods used with other trioxane copolymers and terpolymers. The heat stabilizer used may be, for example, a polyamide, an amide of a polybasic carboxylic acid, an amidine or a urea compound. The oxidation stabilizer may be, for example, a phenol, especially a bis-phenol, or an aromatic amine. An α-oxybenzophenone derivative may be used as light-stabilizer.

The copolymers may be used with special advantage in the injection-molding of large-area articles, and also in extrusion-molding and in the manufacture of sheets, films and fibers.

The following examples serve to illustrate the invention but they are not intended to limit it thereto:

EXAMPLE 1

A trioxane solution containing 2% by weight of ethylene oxide and 0.6% by weight of dioxolanyl-4-methyl-butyl formal was introduced at a temperature of 70° C. by pumping into a Ko-kneader. A solution of $BF_3$-dibutyl etherate in cyclohexane in a proportion of 1:80 was simultaneously injected into the kneader, the rate of pumping being regulated such that 80 p.p.m. $BF_3$ dissolved in the monomer mixture. The polymer was extruded from the kneader into a 1% ammonia solution used as a quenching liquid. The product was ground in the wet state and finally hydrolized in a heterogeneous phase in a 1% ammonia solution in a proportion of 1:4. The hydrolysis was carried out at a temperature of 141° C. under a pressure of 3.6 atmospheres gage. The product was washed and dried, the melt index according to ASTM-D 1238-52T being $i_2=9.3$; $i_{15}=175$ (terpolymer I).

EXAMPLE 2

100 Grams trioxane, 2 cc. ethylene oxide, 0.8 cc. dioxolanyl-4-methyl-ethyl formal were polymerized in a screw-top glass bottle with 10 milligrams para-nitrophenyl-diazonium fluoroborate as catalyst at a temperature maintained by a thermostat at 70° C. After the polymerization was complete, the block was comminuted and ground and then hydrolized in a homogeneous phase at 150° C. for half an hour in 1 liter of benzyl alcohol in the presence of 10 cc. triethanol amine. After the hydrolysis, the copolymer was precipitated with methanol and the suction-filtered product boiled with methanol, washed and dried. The melt index was $i_2=11.5$ and $i_{20}=482$.

Comparative Example 1

The product prepared according to Example 1 was compared to a copolymer that had been obtained in the same manner from 100 parts trioxane and 2 parts ethylene oxide. As a comparative measure the spiral test was used which serves as a measure for the flow of the plastic materials. The length of the spirals was measured in centimeters.

| Melt index | Copolymer | Terpolymer I |
|---|---|---|
| $i_2$ | 9 | 9.3 |
| $i_{15}$ | 90 | 175 |
| Spiral test at— | | |
| 40 atm. gage (cm.) | 22 | 30.5 |
| 50 atm. gage (cm.) | 26.5 | 37.5 |
| 60 atm. gage (cm.) | 30 | 42.0 |
| Impact strength (notched): DIN 53453 kg. cm./cm.$_2$ | 6.1 | 5.8 |

Comparative Example 2

100 grams trioxane, 2 cc. ethylene oxide, 0.8 cc. butanedioldiglycidyl ether were polymerized in a screw-top glass bottle with 10 milligrams para-nitrophenyl-diazonium fluoroborate at a temperature maintained by a thermostat at 70° C. A hydrolysis of the product in benzyl alcohol was not possible because it was insoluble. Moreover, the product was infusible and the spiral test could not be performed. Since it was apparent that the product could not be worked up, it was of no importance for industrial use.

If terpolymers were prepared by means of regulators and minor amounts of butanediol-diglycidyl ether as a ter-component of a viscosity suitable for injection molding, the values of the notched-bar impact strength of these products were about 15% lower than those of the corresponding normal copolymers which did not contain this tercomponent.

We claim:
1. A process for the manufacture of copolyacetals which comprises polymerizing in the presence of a cationic catalyst at a temperature of −50° to +100° C. a mixture of 97.9 to 88.0% by weight of trioxane, 2 to 10% by weight of a cyclic ether of the formula

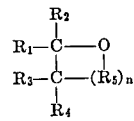

in which $R_1$, $R_2$, $R_3$ and $R_4$ each represent H, an alkyl radical or a halogen-substituted alkyl radical, and in which $R_5$ represents a methylene, oxymethylene, alkyl-substituted methylene, halo-alkyl-substituted-methylene, alkyl-substituted oxymethylene, or a halo-alkyl-substituted oxymethylene radical, and $n$ is 0 to 3, or in which $R_5$ represents —$(O-CH_2-CH_2)_m-OCH_2$, $n$ is 1 and $m$ is 1 to 3 and 0.1 to 2 percent by weight of a dioxolanyl-4-methyl-alkyl formal of the formula

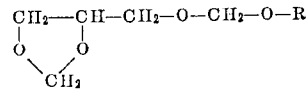

in which the alkyl group R contains 1 to 12 carbon atoms.

2. The process as claimed in claim 1 in which the cyclic ether is ethylene oxide, glycol formal, diglycol formal, propylene oxide, epichlorhydrin or 4-chloromethyl dioxolane.

3. The process as claimed in claim 1, in which the dioxolanyl-4-methyl-alkyl formal is dioxolanyl-4-methyl-butyl formal or dioxolanyl-4-methyl-ethyl formal.

4. A copolyacetal produced by the process of claim 1.
5. A copolyacetal produced by the process of claim 2.
6. A copolyacetal produced by the process of claim 3.

References Cited

UNITED STATES PATENTS 3,275,604  9/1966  Kray et al. _____ 260—67
3,293,219  12/1966  Gottesman et al. _____ 260—67

WILLIAM H. SHORT, *Primary Examiner.*

L. M. PHYNES, *Assistant Examiner.*

U.S. Cl. X.R.

260—45.8, 45.9, 45.95